United States Patent
Tancevski

(12) 
(10) Patent No.: US 6,493,120 B1
(45) Date of Patent: Dec. 10, 2002

(54) OPTICAL FIBER-DELAY LINE BUFFERS WITH VOID FILLING

(75) Inventor: Ljubisa Tancevski, Dallas, TX (US)

(73) Assignee: Alcatel, Richardson, TX (US)

( * ) Notice: Subject to any disclaimer, the term of this patent is extended or adjusted under 35 U.S.C. 154(b) by 0 days.

(21) Appl. No.: 09/253,309

(22) Filed: Feb. 17, 1999

(51) Int. Cl.[7] ............................................... H04J 14/08

(52) U.S. Cl. ...................... 359/140; 359/110; 359/124; 359/128; 359/134; 359/140

(58) Field of Search ................................ 359/110, 128, 359/134, 140, 124

(56) References Cited

U.S. PATENT DOCUMENTS

| | | | | | |
|---|---|---|---|---|---|
| 3,902,165 | A | * | 8/1975 | Artom ........................... | 333/18 |
| 5,581,760 | A | * | 12/1996 | Atkinson et al. ............ | 717/108 |
| 5,617,569 | A | * | 4/1997 | Gray et al. .............. | 707/103 R |
| 5,854,931 | A | * | 12/1998 | Jones et al. .................. | 345/419 |
| 5,940,123 | A | * | 8/1999 | Daigle et al. ................ | 348/163 |

OTHER PUBLICATIONS

*A Flexible Cross–Connect Network Using Multiple Optical Carriers*, by G. Depovere, et al. of Philips Research Laboratories, The Netherlands and N. Wauters, et al. of IMEC–LEA, University of Gent, Belgium (4 pgs.).

* cited by examiner

Primary Examiner—Leslie Pascal
Assistant Examiner—Dzung Tran
(74) Attorney, Agent, or Firm—Gray Cary Ware & Freidenrich, LLP

(57) ABSTRACT

A system and method for filling voids between optical signals during switching in an optical telecommunications system. The optical switch includes a void filling and scheduling software program resident in memory and executable by a processor. The memory also includes the wavelength, position in time, duration for each void between previously scheduled optical data packets. As a new optical data packet arrives at the optical switch, the void filling and scheduling software program will calculate the available delay for each delay line as measured from the arrival time of the new optical signal and schedule the new optical signal within a particular void if (1) one of the available delays falls within the position in time of one of the voids and (2) if the duration of the new optical signal measured from the particular available delay fits within the duration of that void. If the new optical data packet will not fit within any of the existing voids, the void filling and scheduling software program will use a conventional scheduling routing to schedule the new optical data packet on an output fiber.

47 Claims, 4 Drawing Sheets

OPTICAL FIBER-DELAY LINE BUFFERS WITH VOID FILLING

TECHNICAL FIELD OF THE INVENTION

The present invention relates generally to telecommunications systems and methods, and more particularly, to optical telecommunications systems and methods, and even more particularly to optical fiber-delay line buffers that incorporate a void filling procedure to minimize gaps in optical transmissions, for use with fixed and variable length synchronous and asynchronous optical data packets.

BACKGROUND OF THE INVENTION

Telecommunications providers have increasingly moved to optical fiber based networks. Fiber optics telecommunications networks require optical signal processing means, including optical switches or optical routers, at the nodes of the optical network to orient incoming optical signals and select the appropriate output channel. These optical switches or routers are designed to prevent packets of data from colliding because more than one packet has arrived at an output at the same time. Optical switches include buffers to aid in processing the optical data packets through the optical switch.

Conventional optical switching systems exist that are designed to prevent optical data packets from colliding during processing. However, these optical switching systems have failed to address all potential optical data packet configurations, including both synchronous (i.e., time-slotted) and asynchronous, and fixed or variable length optical data packets. This presents a significant limitation because present internet protocol (IP) traffic is asynchronous, variable length traffic. One prior art system discloses an optical switch architecture-specific switching operation that performs collision-free switching on synchronous, fixed length data packets. However, this system is limited to a particular architecture optical switch that does not accommodate variable length, asynchronous optical data packets. Furthermore, this prior art system does not fill the voids or gaps associated with optical data packet transport. Another prior art system also discloses a method of switching optical data packets, however the method is limited to fixed length optical data packets and does not accommodate wave division multiplexing (WDM). Not using WDM transmission causes a significant degradation in overall system performance. Furthermore, this prior art system also fails to disclose a method of filling voids that occur in optical transport systems.

SUMMARY OF THE INVENTION

The present invention provides an improved system and method for buffering optical transmissions that substantially eliminates or reduces disadvantages and problems associated with previously developed optical buffering systems and methods for use in fiber optic data packet transmission systems.

More specifically, the present invention provides a system and method for filling voids between optical signals during switching in an optical telecommunications system. The optical switch includes an optical buffer with a series of output fibers, where each output fiber includes a number of wavelengths, and a series of delay lines for inducing unique delays into incoming optical signals. The optical switch also include a void filling and scheduling software program resident in memory and executable by a processor. The memory also includes the wavelength, position in time, duration for each void between previously scheduled optical data packets. As a new optical data packet arrives at the optical switch, the void filling and scheduling software program will calculate the available delay for each delay line as measured from the arrival time of the new optical signal and will schedule the new optical signal within a particular void if (1) one of the available delays falls within the position in time of one of the voids and (2) the duration of the new optical signal measured from the particular available delay fits within the duration of that void.

If the new optical data packet will not fit within any of the existing voids (either because no delay coincides with the existing voids or because the space in a coincident void is not large enough to accommodate the new optical data packet), the void filling and scheduling software program will use a conventional scheduling routine to schedule the new optical data packet on an output fiber. If a new void is created during the conventional scheduling, the program can store this void in memory and attempt to fill the new void along with the previously unfilled voids as new data packets arrive.

The present invention provides an important technical advantage by filling the time gaps between optical data packets that inherently result during optical switching of optical data packets for non-uniform buffers used in conjunction with synchronous traffic and for asynchronous traffic regardless of whether the buffers are uniform or non-uniform.

The present invention provides another technical advantage by providing an improved optical buffer that can perform void filling for optical data packet that are asynchronous or synchronous, variable length or fixed length.

The present invention provides still another technical advantage by providing an improved optical buffer that can perform void filling for non-uniform buffers that virtually appear larger than equivalent uniform buffers. This increases the system performance for the same hardware, while also filling gaps between optical signals that arise.

The present invention provides another technical advantage by providing an optical buffer that is independent of the optical switch architecture and can provide the buffering for fixed/variable length optical data packets, synchronous/asynchronous optical data traffic mode for various optical switches.

The present invention provides yet another technical advantage by providing a void filling buffer and method of buffering that work equally well for both standard and wave division multiplexing optical transmission systems.

The present invention provides still another technical advantage by improving the performance of fiber delay line optical buffers under asynchronous, variable length traffic without increasing the buffer depth or size.

BRIEF DESCRIPTION OF THE DRAWINGS

For a more complete understanding of the present invention and the advantages thereof, reference is now made to the following description taken in conjunction with the accompanying drawings in which like reference numerals indicate like features.

DETAILED DESCRIPTION OF THE INVENTION

Preferred embodiments of the present invention are illustrated in the FIGURES, like numerals being used to refer to like and corresponding parts of the various drawings. While the FIGURES typically illustrate fixed-length, synchronous traffic mode examples (for simplicity), it should be understood that the present invention is equally applicable to any combination of fixed length/variable length, synchronous/asynchronous optical data packets.

Optical data packet switching or routing is accomplished according to the present invention using a void filling and scheduling procedure that inserts optical packets into gaps or voids created by processing previous optical packets through the output of the optical switch. The present invention provides an improved optical buffer that uses a void filling methodology to increase the performance of a fiber optic switch. The optical buffer of the present invention can accomplish void filling on variable or fixed optical data packets that are either synchronous (i.e., time-slotted) or asynchronous.

Optical switches incorporate optical buffers that introduce system-unique problems. Unlike electronic memories where the memory capacity (i.e., buffer depth) and the holding time are separate and distinct parameters, conventional optical buffers are degenerate in the sense that these two features are intimately related. Thus, an optical buffer with holding time of x packets has a capacity of x (distinct) packets as well. Hence, building a buffer with a larger holding time requires increasing the buffer depth. One basic feature of conventional optical buffers is that the delays tile uniformly the across the entire range of the buffer depth in increments of one unit in order to assure uniformity of the traffic at the output. This uniform tiling preserves a first-in-first-out (FIFO) mode of operation. The set of delays can be represented as (1, 2, 3, ..., B−1, B) where B is the overall buffer depth.

Figure 1A:
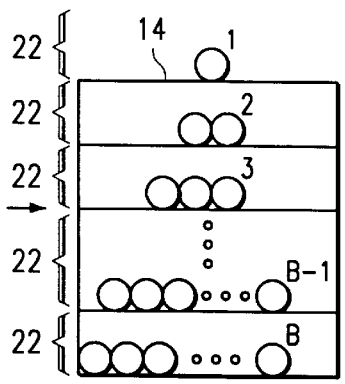
FIG. 1A is a graphical representation of a degenerate optical buffer.
Figure 1B:
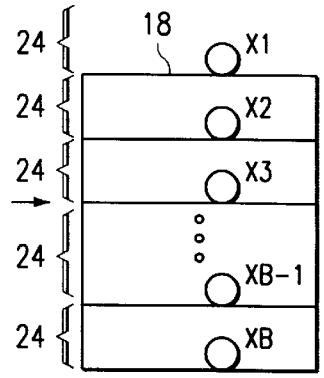
FIG. 1B is a graphical representation of a non-degenerate optical buffer.

FIGS. 1A and 1B illustrate graphically the differences between a degenerate and non-degenerate buffer. FIG. 1A is a graphical representation of a degenerate (i.e., uniform) optical buffer 14 included in a broadcast and select switch. In FIG. 1A, the buffer 14 has B total delay lines 22 distributed uniformly between 1 and B in increments of one. Likewise, the length or depth of each delay line 22 is indicated on FIG. 1A. As shown, the number of delay lines 22 equals the depth of the buffer 14 in FIG. 1A. Given the restrictions on buffer depth, the drive is to build more efficient buffers with better performance for the given depth B.

FIG. 1B is a graphical representation of a non-degenerate (i.e., non-uniform) optical buffer 18 that can be used to increase the holding time of the buffer over the same total buffer depth by utilizing non-uniformly distributed delay lines 24. Each delay line 24 within the buffer 20 is noted from Xl to XB where B is once again the total buffer depth (i.e., number of distinct delay lines in the buffer). Each delay Xi can assume any value provided that the values are distinct (i.e., the delay lines 24 are not distributed in increments of one unit). FIG. 1B also shows the length of each delay line 24. The resulting optical buffer 20 once again has a buffer depth B, but the delay lines 24 are not uniformly distributed between 1 and B. The delay lines 24 can be completely randomly distributed. If the maximum delay {Xi} is greater than or less than B, the holding time becomes different from the buffer capacity and the degeneracy is broken. Therefore, in order to build larger buffers, if max{Xi}>B, then the optical buffer will have a larger holding time than buffer depth. For clarity, FIGS. 1A and 1B illustrate buffers for data packets having a fixed length. It should be understood that the description is equally applicable to variable length packets.

The inadvertent effect of using non-uniform delay lines is that there are voids in the distribution of the optical data packets at the output of the optical buffer. This results in excess utilization and degrades markedly the system performance. The situation is further complicated in asynchronous, variable length internet protocol (IP) transport (native IP transport) where these voids are present naturally, even if the buffers have a completely uniform distribution.

Figure 2A:
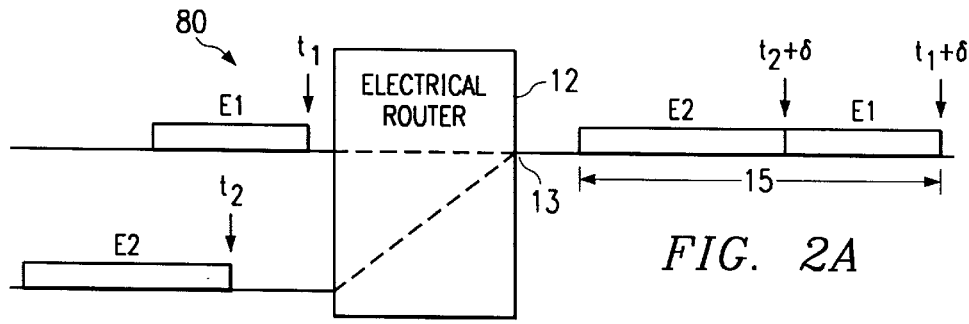
FIG. 2A is a graphical representation of part of a conventional electrical telecommunications system.
Figure 2B:
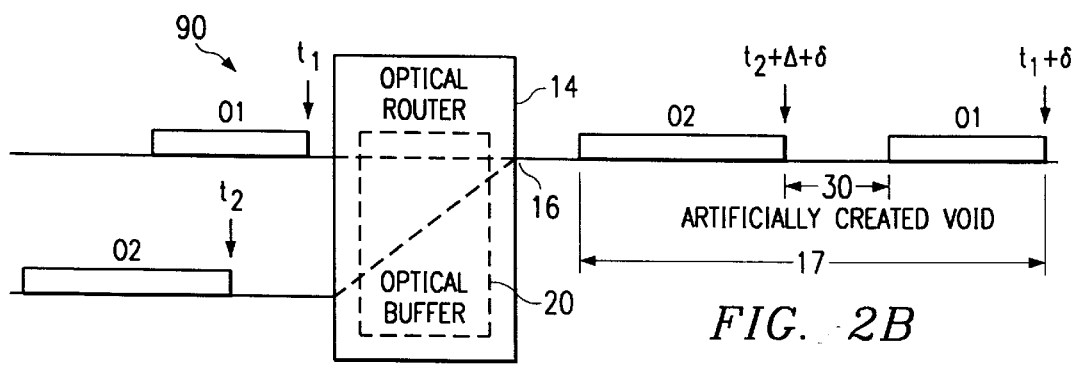
FIG. 2B is a graphical representation of part of a conventional optical telecommunications system for comparison to FIG. 2A.

FIGS. 2A and 2B further illustrate the problem that arises using non-uniform buffers or asynchronous traffic mode by way of a comparison between a conventional electronic telecommunication system 80 (FIG. 2A) and a conventional optical telecommunication system 90 (FIG. 2B).

FIG. 2A shows two electrical data packets, E1 and E2, arriving at an input to electrical switch 12 at different times ($t_1$ and $t_2$). Both electrical data packets E1 and E2 will be sent out of electrical switch 12 at output 13. However, the difference in time between $t_1$ and $t_2$ is such that with no buffering (or time delay), the signals E1 and E2 would collide and data would be lost. Therefore, an electronic buffer (or memory) within electrical switch 13 will delay electrical signal E2 so that when both E1 and E2 are sent through output 13 so as not to collide (i.e., the output signals will occupy different time positions). Electronic buffers are very precise and can delay electrical data packet E2 for essentially any period of time necessary. Thus, electrical data packet E2 can be delayed just long enough so that E2 is output precisely after E1, as shown in FIG. 2A. Thus, at the output 13, electrical signal E1 leaves at time $t_1+\delta$ and electrical signal E2 leaves at time $t_2+\delta$, where $\delta$ is the process delay through the electrical switch 12.

However, optical switches do not have the same precision as electrical switches. FIG. 2B shows the same situation as FIG. 2A for two optical data packets, O1 and O2, that arrive at the optical switch 14 at the same relative position as electrical packets E1 and E2 arrived at electrical switch 12. However, due to the less precise granularity of the optical buffer 20 (especially for asynchronous and non-uniform synchronous traffic), the optical buffer 20 cannot delay the second optical signal O2 for precisely the optical process delay at the output 16 of the optical switch 14. In order to avoid collision between O1 and O2, the optical buffer 20 must delay the O2 signal for some time period greater than the optical processing delay δ. As shown in FIG. 2B, at the output 16, optical signal O1 leaves at time $t_1+\delta$ and optical signal O2 leaves at time $t_2+\delta+\Delta$, where δ is the process delay through the optical switch 12 and Δ is the void 30 caused by the delay lines in the optical buffer. As a result, comparing FIG. 2A to FIG. 2B, the time space 17 filled by the two optical signals O1 and O2 is greater than the time space 15 filled by the two electrical signals E1 and E2. The difference in time, represented as Δ, is the gap or void 30 inherent to optical processing 20. This gap or void 30 is also referred to herein as excess utilization because the "apparent" utilization of optical packets O1 and O2 is time space 17, whereas the "actual" utilization is time space 17 minus void 30. This excess utilization problem occurs whenever non-uniform buffers are used in conjunction with synchronous optical traffic and at all times with asynchronous optical traffic (even with uniform buffers).

Figure 2C:
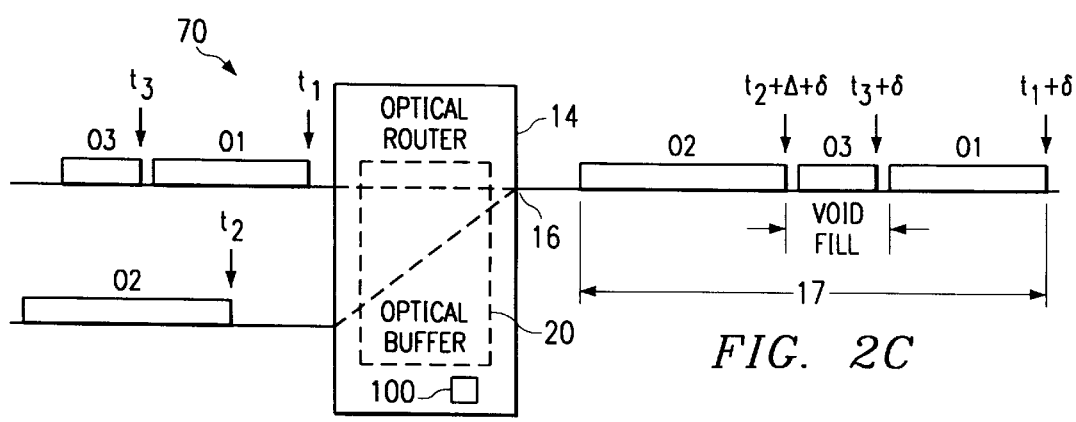
FIG. 2C is a graphical representation of part of a conventional optical telecommunications system incorporating an embodiment of the present invention.

The present invention uses void filling and scheduling software 100 to place one or more optical packets in the void 30 between optical signal O1 and optical signal O2 (and similarly in other voids between other optical signals during operation of the optical switch). FIG. 2C shows the result of applying the void filling and scheduling software 100 of the present invention to the situation of FIG. 2B in order to slot a third optical data packet O3 in the void 30 between optical data packet O1 and optical data packet O2. As was the case in FIG. 2B, optical signals O1 and O2 arrive at optical switch 14 at times $t_1$ and $t_2$, respectively. Additionally, a third optical signal O3 arrives at the optical switch 14 at time $t_3$. By applying the void filling and scheduling software 100 to the three optical signals, third optical signal O3 is inserted into void 30 to "fill" a portion of the void 30. Note that the location of optical signal O3 may or may not occur precisely behind signal O1, but must fit in the gap between O1 and O2 in order to avoid losing data. As shown in FIG. 2C, at the output 16, optical signal O3 leaves at time $t_3+\delta$ where δ is the process delay through the optical switch 12. As a result, comparing FIG. 2C to FIG. 2B, using the void filling and scheduling software program 100 the time space 17 is now filled by three optical signals (O1, O2 and O3), rather than just the two optical signals O1 and O2. Thus, the excess utilization is decreased and the "apparent" utilization is closer to the "actual" utilization.

Figure 3A:
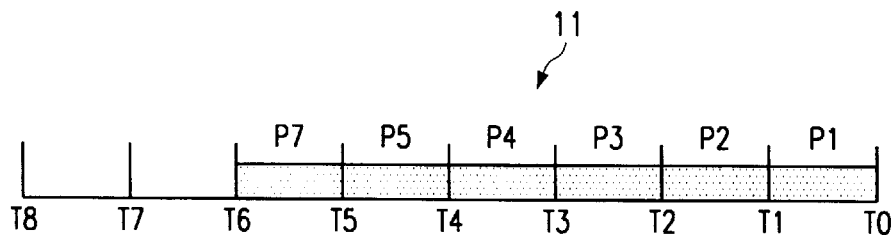
FIGS. 3A and 3B show representative output fields for conventional degenerate optical buffers.
Figure 3B:
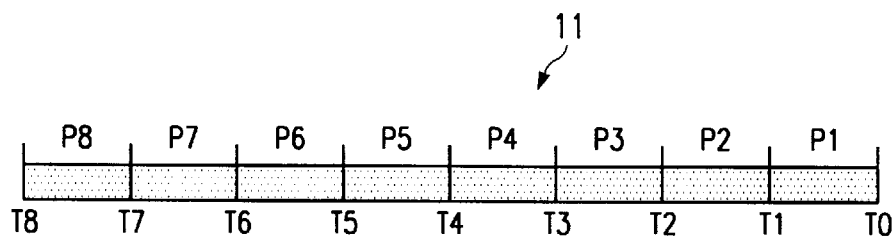
Figure 3C:
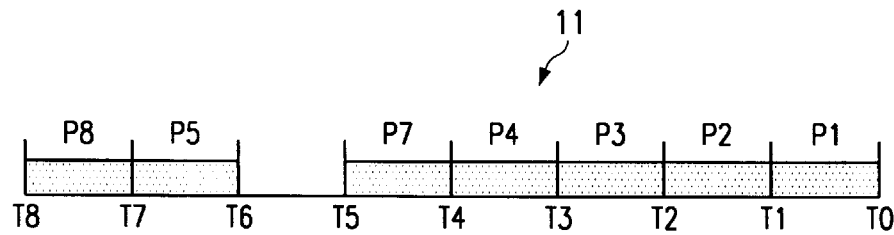
FIG. 3C shows a representative output field for a non-degenerate optical buffer resulting from the use of an embodiment of the void filling and scheduling software of the present invention.

To further illustrate, consider the example of an empty buffer in a synchronized, fixed-length packet traffic scenario as shown in FIGS. 3A–C. For each of FIGS. 3A–C, prior to time T0, the buffers are empty, at time T0, six (6) optical packets, P1, P2, P3, P4, P5, and P6, arrive at an optical switch destined for the same output, while at time T1 two additional packets, P7 and P8, arrive at the optical switch bound for the same output. FIGS. 3A–3C show the output field 11 for the optical buffer for three different buffer configurations. FIG. 3A shows the output field 11 for a conventional degenerate (i.e., uniform) buffer with buffer depth B=4 (i.e., having four uniform delay lines numbered 1, 2, 3 and 4 units). When the first six packets arrive at the buffer, the first packet P1 is undelayed, as shown by its placement prior to T0 or zero delay. The second packet P2 is delayed for one unit (placed after T1), P3 is delayed for two units, P4 is delayed for three units and P5 is delayed for four units as shown in FIG. 3A. However, since this uses up the four delay lines of the uniform buffer, the sixth packet P6 is dropped. Upon the arrival of the two additional packets P7 and P8 at time T1, the first of the two packets P7 can be stored at the position labeled T5 by delaying it four units, but this again fills the buffer and the P8 packet must be dropped. The result of this uniform, four delay line buffer for our example is that packets P6 and P8 are dropped due to buffer overflow.

FIG. 3B shows the output field 11 for another conventional degenerate (i.e., uniform) buffer with buffer depth B=6 (i.e., having six uniform delay lines 1, 2, 3, 4, 5 and 6 units) so that it is capable of accommodating all six initial packets. In FIG. 3B, when the first six packets arrive at the buffer, each packet is accommodated due to the holding time of six (6). Upon the arrival of the two additional packets P7 and P8 at time T1, these packets are stored at the next two positions and no packets are dropped. The result of this uniform, six delay line buffer for our example is that none of the packets are dropped. The buffer of FIG. 3B can accommodate all of the eight packets with no data loss. However, the six delay line buffer of FIG. 3B is more expensive to build than the four delay line buffer of FIG. 3A.

FIG. 3C illustrates the output field 11 for a non-degenerate (i.e., non-uniform) buffer of depth four (4) with four delay lines of 1 unit, 2 units, 3 units and 6 units, respectively (i.e., a holding time of six (6)). In our scenario, packets P1, P2, P3, P4 and P5 are routed undelayed, delayed for one unit, delayed for two units, delayed for three units and delayed for six units (shown slotted after D6), respectively. Packet P6 is again dropped due to buffer overflow. As can be seen in FIG. 3C, there are two voids in the output field 11, one between D4 and D5 and another between D5 and D6.

Using the intelligent scheduling incorporating void filling of the present invention, the first void between T4 and T5 can be filled with the packet P7 and then packet P8 can be delayed for six units and placed after T7 (similarly to how P5 was placed six units behind P1). The solution shown in FIG. 3C complicates the time relationship between packets with the result that packet P7 appears at the output before packet P5. Accordingly, the buffer of FIG. 3C, represents a non-fifo preserving buffer. The result of using the void filling and scheduling software 100 of the present invention on a non-uniform buffer having a depth of four for our scenario was that one packet (packet P6) was dropped, as compared to two packets (packets P6 and P8) for a uniform buffer without void filling (as shown in FIG. 3A).

As shown through a comparison of FIG. 3C to FIGS. 3A and 3B, the non-degenerate buffer using void filling of FIG. 3C can be expected to exhibit better performance than a degenerate buffer having the same buffer depth (FIG. 3A) and worse than a degenerate buffer having the same holding time (FIG. 3B). It should be noted that the buffers should be preferably operated in the full speed in wavelength mode of operation, which stipulates that there is a distinct wavelength for each packet at a specific delay line. This translates into increasing substantially the capacity of the buffer and it also allows wavelength interleaving at the output, thus reducing substantially data losses.

Figure 4:
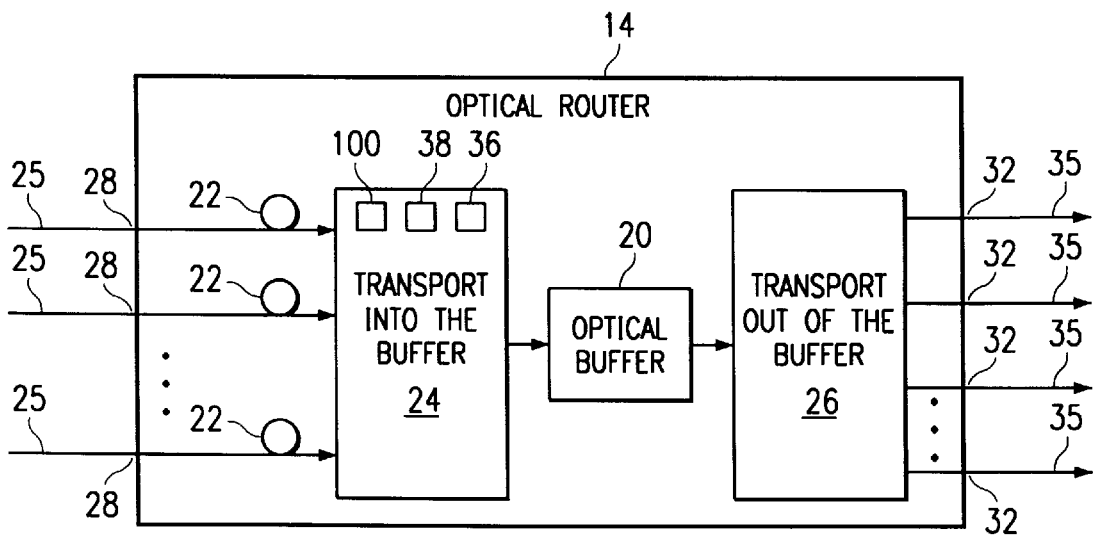
FIG. 4 shows an exemplary optical switch incorporating an embodiment of the present invention.

The ability to fill the voids between packets (e.g., placing packet P7 between packet P4 and packet P5 in FIG. 3C) is accomplished through the void filling and scheduling software 100 of the present invention. FIG. 4 shows an exemplary optical switch 14 in modular form. Optical data packets travel into optical switch 14 on input fibers 25 and arrive at the switch 14 at inputs 28. The data packets 40 will experience processing delay 22 to compensate for the void prioritization and scheduling performed by void filling and scheduling software 100. The optical data packets are transported to optical buffer 20 through transport 24 that includes the void filling and scheduling software 100, memory 38 and processor 36. Processor 36 executes void filling and scheduling software 100, while memory 38 stores the various data packet and void information. The optical data packet are transferred out of the optical buffer 20 though transport 26 to outputs 32 of output fibers 35. The present invention uses void filling and scheduling software 100 of the present invention to increase performance through optical switch 14.

The void filling of the present invention will work over many wavelengths of data at every input/output fiber and for data packets of variable or uniform length that arrive synchronously or asynchronously. For purposes of the present invention, the time of packet arrival at the optical switch and the packet destination are extracted from the data packet header. Each data packet is placed in a fixed delay line to compensate for the amount of time required to extract and process the header information (i.e., each data packet is assigned an "arrival time"). Each optical data packet also remains in the delay line until the void filling and scheduling has been performed, as described more fully below. The void filling and scheduling are performed prior to the sending the data packet to the optical buffer. For every wavelength at every output fiber 35 a field (called virtual wavelength field) is created by the void filling and scheduling software 100 that is gradually filled with data packets destined for that output fiber 35. It is not necessary that a data packet which arrived at a certain input wavelength be placed at the same output wavelength, which means that there is a wavelength conversion stage that allows interleaving of wavelengths to better utilize the overall capacity of the optical buffer 20.

As optical data packets are processed through the optical buffer 20, each void 30 in each of the virtual wavelength fields is stored in memory 38 with an indication of its position in time and length. When a new optical data packet arrives, the void filling and scheduling software 100 program will attempt schedule the packet in such a way as to fill an existing void 30 in any of the wavelength fields assigned to the specific output to which the data packet is assigned. This allows deflection in wavelength but no deflection in space. Hence all the voids in all the wavelength fields associated with the specific destination fiber are inspected and if it is found that there is a delay which would place the packet within a void, and if the duration of the void is longer than the packet duration, the packet is scheduled to be transported in the time corresponding to the void. The memory 38 is then updated to reflect the filling of the void by shortening the void length by the duration of the newly scheduled packet.

If there is no void that meets these delay and length criteria, a normal scheduling of the optical data packet is performed. In one embodiment, the data packet that does not fill a void is scheduled to be transported at the desired output fiber at a wavelength whose virtual field is minimum in time duration (measured from the time of arrival of the data packet). If the distance from the time of the data packet arrival to the end of the virtual wavelength field is smaller than the maximum holding time of the buffer, the data packet is scheduled such that it is delayed for the nearest delay greater than or equal to that distance. If there is delay equal to that distance, no new void is created in the output wavelength field. If the delay is greater than the distance, a new void is created. The length of the new void, its start time and its end time are stored in memory 38. This new void, along with the existing voids in memory, will then be inspected upon the arrival of the next data packet to determine whether it can fill any of these voids. If the distance from the time of arrival of the packet to the end of the virtual wavelength field with minimum duration is greater than the holding time of the buffer 20, that means that there is no available delay line, which results in buffer overflow and the packet is dropped.

Figure 5:
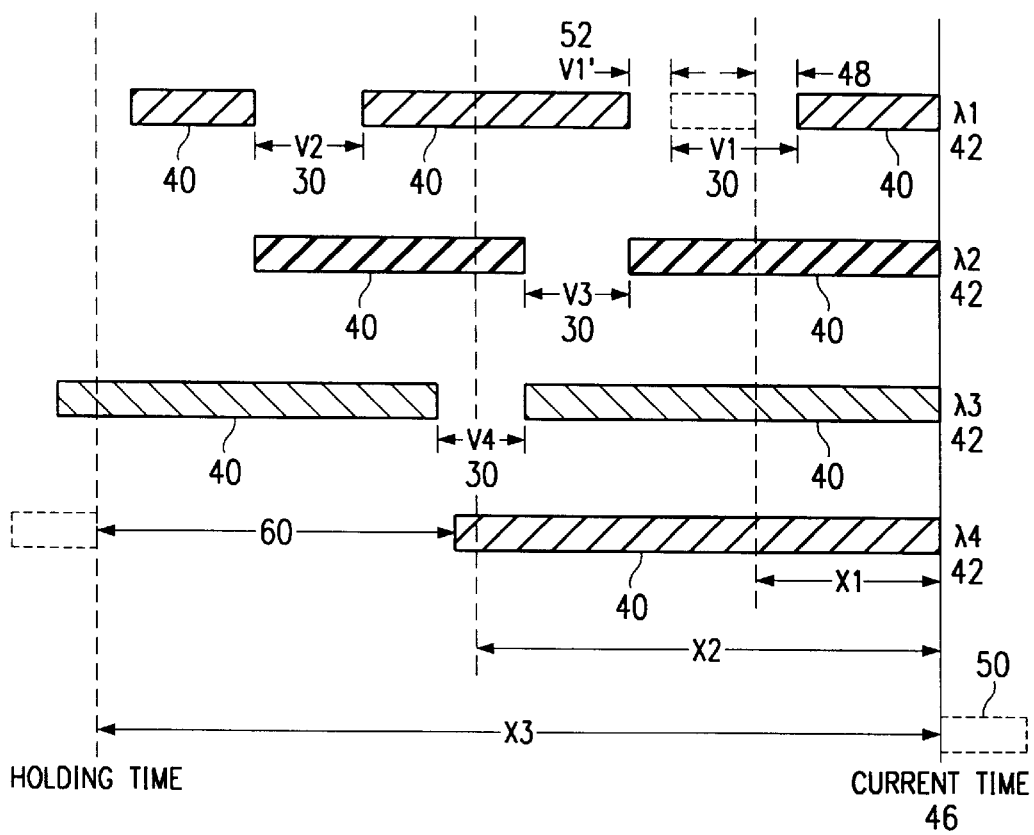
FIG. 5 show graphically the operation of one embodiment of the void filling and scheduling software of the present invention.

FIG. 5 describes graphically the operation of the void filling and scheduling software 100 of the present invention that calculates the time and wavelength at which each optical signal should appear at the output of the optical switch. As shown in FIG. 5, the optical data packets 40 are asynchronous and variable length, however, the void filling and scheduling software 100 will fill voids for any optical data packet processing mode of operation. Each of the input and output fibers of an optical switch 14 have many wavelengths in WDM operation. FIG. 5 shows an example of a four wavelength per fiber optical buffer. For the output fiber shown, the void filling and scheduling software builds virtual output wavelength fields 42 (labeled $\lambda_1$, $\lambda_2$, $\lambda_3$ and $\lambda_4$), otherwise known as virtual queues, and stores them in memory 38. These virtual queues 42 track the relationship of output optical data packets to one another according to how each is scheduled to leave the optical buffer. The void filling and scheduling software 100 begins filling the virtual output wavelength fields 42 with data packets 40, each of which is scheduled to leave the optical buffer 20 at a certain time and wavelength using time stamping. In the example of FIG. 5, four wavelengths of the exemplary fiber have a virtual wavelength field occupancy as shown by the data packets 40.

FIG. 5 also shows the current time 46, the holding times corresponding to the delay lines Xi of an output fiber (shown as X1, X2 and X3) and the holding time corresponding to the maximum delay line (X3). The current time 46 represents the time of arrival of a new (non-scheduled) optical data packet 40 and the holding times are shown relative to the current time 46. As shown in FIG. 5, the buffer depth or buffer capacity is three (3). Labeled with Vi are the voids in the output fields (V1, V2, V3, and V4). As shown in FIG. 5, virtual wavelength $\lambda_1$ has three data packets 40 and two voids 30 (labeled V1 and V2).

FIG. 5 also shows graphically which void positions are addressable at the time the new data packet 50 arrives. Thus, each of the delays Xi are measured from the current time 46. When the current time 46 plus the delay for a particular delay line intersects a position in time of a void, that void is available to be filled by the incoming data packet. For example, in FIG. 5, delay X1 intersects void V1 and delay X2 intersects void V4, while delay X3 does not intersect a void and voids V2 and V3 are not intersected by any delay calculated from the current time 46. Thus, for the delays X1, X2, and X3 of FIG. 5, only voids V1 and V4 are addressable when a new data packet 50 arrives at current time 46.

The void filling and scheduling software program 100 includes a void filling program 110 that initially attempts schedule the new optical data packet 50 so that it fills one of the existing voids 30. The memory includes the start in time of the void, the end in time of the void and the wavelength for every void at the output of the buffer 20. In one embodiment, the void filling program 110 can operate to try to fit the newly arrived data packet 50 first into void V1, then into void V3, then void V4 and finally into void V2 (i.e., in descending order of oldest to youngest in time). In other words, the void filling program 110 will try to schedule the new optical data packet 50 into voids whose position in time is nearest the current time. Note that this choice of void prioritization is not the only possibility. In another embodiment, the void filling and scheduling program 100 could examine voids within a single wavelength first, then all voids in a second wavelength, through the wavelengths available. In yet another alternative, the void filling and scheduling program 100 can examine the delay lines from briefest to longest to determine whether a particular delay will fall within a void. In order to fit the new data packet within a void means that a delay Xi must exist which will delay the new packet from the current time 46 long enough so that the beginning of the delayed new packet will fit within the time position occupied by the void. Once such a delay is found, the packet length must fit within the length of the void as measured from the available delay Xi.

In operation, upon the arrival of a new data packet at time equal to the current time in FIG. 5, the void filling program 110 will invoke from the virtual queues the positions in time and the duration of the voids 30. These void positions are compared to the delay lines to determine which voids are addressable at the time the new data packet arrives. The void filling program 110 will first try to fit the new optical data packet 40 into void V1 (as the nearest to the current time 46). As shown, the first delay, X1, from the current time 46 falls within the void V1. Since there is an available delay (X1) which delays the packet enough so that its beginning falls within the void V1, this void V1 represents a possible time slot in which the new data packet 50 can be scheduled. The void filling program 110 will only place the new data packet 50 in void V1 if the length or duration of the new data packet 50 fits in the time interval between "current time+ delay X1" and the end of void V1. In other words, the new data packet 50 must fit in the space remaining in void V1 after the delay line from delay X1. Thus, the size of the new data packet affects whether it can be slotted into a particular void, even if one of the available delays will delay the new packet long enough to fit within the particular void.

Assuming that the new data packet 50 will fit within the available space in void V1, the void filling and scheduling software 100 will schedule the new data packet 50 within void V1 by delaying it using the X1 delay line and slotting it for wavelength $\lambda_1$. The void filling program 110 will determine the time the new data packet 50 will leave the optical buffer and the wavelength upon which the new data packet 50 will leave. In our example, the wavelength is $\lambda_1$ and the time to leave is the current time plus the delay X1. As can be seen, the filling of void V1 with new data packet 50 cause the creation of at least one and probably two new gaps 48 and 52. There are several options to dealing with these new gaps 48 and 52: (1) both can be tracked as "new voids" that can be filled using the void filling and scheduling software; (2) one of the two can be treated as a "new void"; or (3) neither is considered a new void and both are ignored. In one embodiment, the void filling and scheduling software 100 will consider gap 48 that occurs prior to new data packet 50 as a new void V1 and will ignore the gap 52 that occurs after new data packet 50. The gap 52 will essentially become lost space that is unused by any optical data packet. This is done due to the increases in complexity as the number of voids to be inspected increases. The void filling program 110 can now update the memory 38 so that the void positions for the virtual wavelength $\lambda_1$ include the original void V2 and new void V1' (at gap 52). The next time a new packet arrives, void V1" will be considered along with V2, V3, and V4.

Alternatively, assuming the new data packet 50 will not fit within the available space in void V1, the void filling program 110 will then try to fit the packet in void V3. However, since no delay exists that will slot the new packet into void V3, the program moves on to void V4. The program 110 performs the a similar analysis to determine the delay X2 will provide sufficient delay so that the new data packet 50 can be slotted into void V4. The program 110 then determines whether the void will fit in the space available in void V4 (between current time+ delay X2 and the end of void V4). If the new data packet 50 will fit, then it is scheduled in void V4. If the new data packet 50 does not fit in void V4, the void filling part of the of the void filling and scheduling software is complete and normal scheduling commences.

The void filling and scheduling software program 100 can also include a conventional scheduling program 120 that, upon the failure to schedule the new optical data packet 40 within any existing void 30, will schedule the new optical data packet 40 based upon normal scheduling rules. In one embodiment, the conventional scheduling program 120 will attempt to find the virtual wavelength field 42 with the minimum occupancy (or duration) in time and schedule the new data packet 50 at the next available delay for this virtual wavelength field 42. For the example of FIG. 5, virtual wavelength field $\lambda_4$ has the minimum data packet occupancy (i.e., every other virtual wavelength field 42 is more fully occupied by outgoing data packets). As shown in FIG. 5, existing data packets 40 within wavelength field $\lambda_4$ occupy time extending beyond the delay of X1 and beyond the delay of X2. Thus, if the new data packet 50 were only delayed X1 or X2, a collision would occur with existing data packets 40 on wavelength $\lambda_4$ and data would be lost. To avoid this result, the conventional scheduling program 120 will schedule new packet 50 to be delayed for X3 at wavelength $\lambda_4$. As shown in FIG. 5, placing the new data packet 50 on wavelength $\lambda_4$ delayed X3 time from the current time will create a "new void" 60 between the end of the current data packet occupancy of wavelength field $\lambda_4$ and the beginning of the new data packet 50 at current time +X3. The conventional scheduling program 120 will store the start time (current length of data packets in $\lambda_4$), end time (current time+X3) and wavelength ($\lambda_4$) of the new void 60 in memory 38. The void filling and scheduling software program 100 can now update the memory 38 so that the void positions for the virtual wavelength $\lambda_4$ include the new void 60. New void 60 will available for filling when the next new packet arrives. The entire void filling process illustrated in FIG. 5 is performed prior to admitting optical data packets into the optical buffer for every output port of the optical switch.

In one embodiment, to avoid complexity issues, the void filling and scheduling software program 100 can perform an analysis of existing voids each time a new void is created. If a new void is created and the number exceeds a predetermined set number, the void filling and scheduling software 100 can perform a void re-writing process where, for example, the oldest void is dropped and the new void occupies the memory position of the dropped void. Alternatively, if a new void is created and an old void has been extinguished (i.e., passed in time by the current time), then the new void takes the memory position of the extinguished void. In operation, the void filling and scheduling software 100 will maintain all voids up to a predetermined number, and upon reaching that number, the new void will take the memory position of the oldest void and the oldest void is lost. In our example of FIG. 5, assume that there are four memory positions and these four memory positions are occupied by voids V1, V2, V3 and V4. Now assume that a new data packet 50 arrives and will not fit in void V1 or void V4 and must be positioned at current time plus X3 at wavelength $\lambda_4$ and new void 60 is created as previously described. Because the pre-set number of void memory positions is four, when new void 60 is created, void filling and scheduling software 100 will first determine whether the void V1 has been extinguished because the current time has passed the time position occupied by void V1. If so, then the program 100 writes the new void 60 into the memory position of the extinguished void V1. If not, then the program 100 will re-write the memory position occupied by void V1 with the information of new void 60. Thus, old void V1 is dropped from memory. The result is that the space occupied by the void V1 is no longer a possible space for new data packets to be placed. It should be understood that if there are unlimited memory positions available for storing void position information, then the void filling software 100 need not contain a void re-writing subprogram. If, on the other hand, the memory is limited, some void re-writing scheme should be included within the void filling software program 100. The void re-writing method described herein is only one example of the many void re-writing methods.

One of the unique features of the void filling and scheduling software program 100 of the present invention is that as new optical data packets arrive, the program first attempts to fill voids created between previously processed packets, and if unsuccessful, conventional scheduling is assumed. The present invention can be used with degenerate or non-degenerate buffers for both fixed length packet traffic (ATM, optical packets) and to variable length packet traffic (IP, bursts).

The following pseudo-code describes the methodology of one embodiment of the void filling and scheduling software 100.

```
Create virtual wavelength fields;
Assign current time to the new packet;
Find its destination fiber;
% void filling:
for j=1; to j<=number_of_voids_in_the_destination_fiber_at_all_virtual_wavelength_fields
    for delay=0 to delay<=max{Xi}
        if delay>start_of_void and > end_of_void
            if delay + new_packet_length < end_of_void
                time_to_leave=current_time+delay;
                wavelength_to_leave=wavelength_of_the_void;
                start_of_new_void=current_time+delay+new_packet_length;
                scheduling=successful;
                exit_void_filling_routine;
            }
        }
    }
}
% normal scheduling:
if void filling=not_successful;
    find virtual_wavelength_field with minimum length;
    length=minimum_length_field_length;
    wavelength=minimum_length_field_wavelength;
    if length > max{Xi}; drop_new_packet
    if length < max{Xi}
        for delay=X1 to delay=max{Xi}
            if delay>length
                time_to_leave=current_time+delay;
                wavelength_to_leave=wavelength;
                start_of_new_void=length;
                end_of_new_void=current_time+delay;
                wavelength_of_new_void=wavelength;
            exit_normal_scheduling_routine;
            }
        }
    }
}
```

As shown, the void filling and scheduling methodology includes some initial set-up steps which are optionally part of the void filling and scheduling software 100. The initial set-up steps include creating virtual wavelength fields for each wavelength of each output fiber of the optical switch and, as each new optical data packet arrives, assigning it a current time and determining its destination output fiber. At this point the void filling portion starts. The void filing program 110 examines each of the voids in the new data packet's destination fiber across all wavelengths for that destination fiber and each of the delays for the delay lines of the optical buffer. The delays are measured from each "current time" for each newly arriving data packet. As shown, the delays are examined in order from the minimum delay to the maximum delay. As the void filling program 110 finds a delay that falls within the time position of a void in the destination fiber (i.e., the measured delay is greater than the start of the void and less than the end of the void), the program 110 will examine whether the new data packet will fit in that void. This is determined by comparing the length of the new data packet to the space between the delay and the end of the void. If the new data packet will fit, it is scheduled in that void. If not, then the next delay is examined until all delays are exhausted. If the new data packet will fit within a void, the program 110 assigns the new data packet a time to leave that equals the current time plus the delay and a wavelength on which to leave which is the wavelength of the void. The void filling program 110 can also start a void re-writing subroutine that will place the start of a new void in memory as the current time plus the delay plus the length of the new data packet.

If the new data packet will not fit within any of the existing voids, the conventional scheduling routine is run in order to schedule the new data packet. In the embodiment shown, the conventional scheduling program 120 will determine which of the destination fiber's virtual wavelength fields has the minimum used space and will schedule the new data packet in that wavelength field. For that virtual wavelength field, the length of the currently scheduled data and the wavelength are determined. The normal scheduling program 120 then compares the length used to the delays (again, as measured from the current time) to determine if there is a delay which will delay the new data packet sufficiently to avoid a collision with the data packets already scheduled on the wavelength field. If not, the new data packet is dropped. If so, the new data packet is delayed for the minimum delay that will avoid a collision. The conventional scheduling program then schedules the new data packet to have a time to leave equal to the current time plus the delay used and the wavelength to leave which is the minimum length wavelength. For the embodiment shown in the pseudo code, the conventional scheduling program 120 includes a void re-writing subroutine that stores a newly created void (between the end of the last packet on the wavelength and the start of the new data packet) in memory. This is accomplished by recording in memory the start of the new void equal to the length of the existing data packet, the end of the new void equal to the current time plus the delay, and the wavelength of the new void.

Figure 6A:
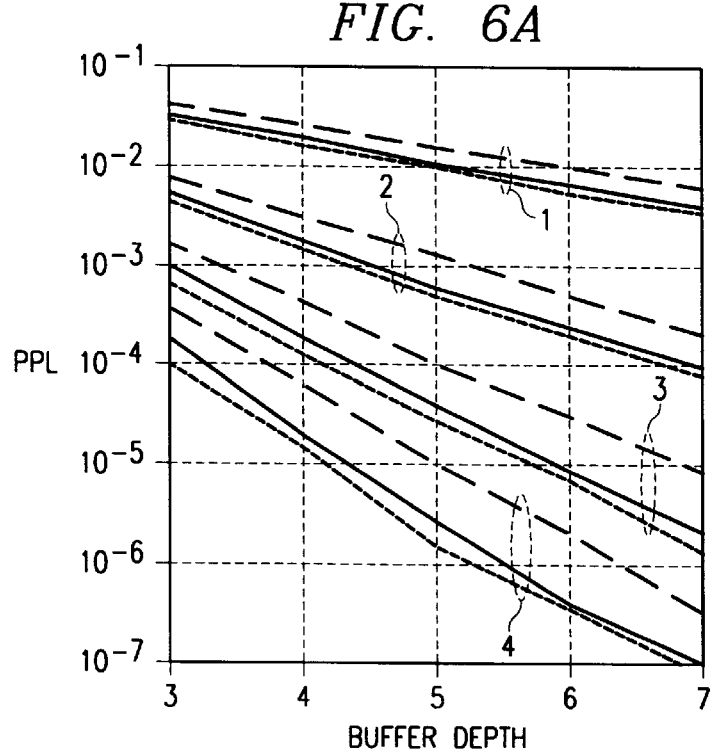
FIG. 6 is a graph of a simulation of an 16×16 optical broadcast and switching under uniform, synchronous ATM traffic with a network load of 0.8 to illustrate the performance advantages of degenerate over non-degenerate optical buffers.
Figure 6B:
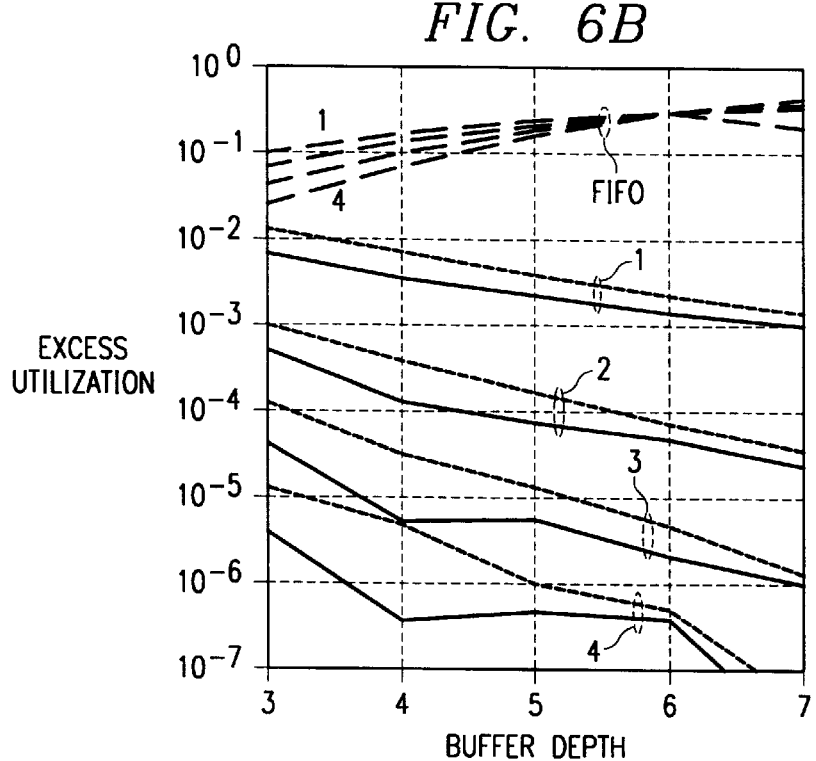

FIGS. 6A and 6B are graphs of a simulation performed on a simulation 16×16 broadcast and select switch under uniform, time-slotted ATM traffic with network utilization of 0.8. The curves with dashed lines in FIG. 6A represent the probability of optical data packet loss versus the buffer depth for the degenerate case with the number of wavelengths per fiber as a parameter. The curves with full lines represent the non-degenerate buffer with delays (1, 2, 3, . . . , B–1, 2(B–1)). As shown in FIG. 6A, the simulation indicates that there is a sizable reduction in the probability of packet loss for a non-degenerate buffer as compared to the degenerate buffer: for a 4 wavelengths/fiber scenario, a non-degenerate buffer with depth equal to 6 has the same performance as a degenerate buffer with depth equal to 7. Simulations of buffers with even greater holding times were performed and the results are shown with dotted lines in FIG. 6A. FIG. 6A also shows that the performance of the non-degenerate buffer nests between the two limits: the performance of non-degenerate buffer with depth equal to 3 is nested between the performance of the degenerate buffer with depth equal to 3 and the degenerate buffer with depth equal to 4, and so on.

FIG. 6B illustrates the excess utilization generated without void filling. The full lines in FIG. 6B represent the excess utilization in the case of void filling that serves as a measure of the success in filling the voids. The choice of delay lines was (1, 2, 3 . . . B–1, 2(B–1)+1) so that the last delay line was increased for an increment of one relative to the previous simulations, resulting in larger holding time. Even though the void filling factor (expressed by the excess utilization in FIG. 4B by the dotted lines) was poorer, the buffer performs slightly better. This indicates that better performance can be achieved by increasing the holding time up to a certain point, after which the degraded void filling factor will start affecting the performance.

TABLE 1

| Traffic | Degenerate Buffer with Same Depth Limit | Non-degenerate | Degenerate Buffer with Same Holding Time Limit |
|---|---|---|---|
| Uniform | 0.00006 | 0.00002 | 0.000002 |
| Bursty 2 | 0.003 | 0.001 | 0.0006 |
| Bursty 4 | 0.016 | 0.009 | 0.0083 |
| Bursty 20 | 0.062 | 0.052 | 0.0518 |

Table 1 shows a comparison of the probability of packet loss between a degenerate buffer with the same depth limit and delays {1, 2, 3, 4} a non-degenerate buffer with delays {1, 2, 3, 6}, and a degenerate buffer with the same holding time limit and delays {1, 2, 3, 4, 5, 6} for uniform traffic under bursty traffic conditions (burstiness of 2, 4, and 20). The traffic load is 0.8 and 4 wavelengths per fiber are assumed. The advantages of non-degenerate buffers over the degenerate one can be even more clearly seen under these bursty traffic conditions. As shown in Table 1, as the burstiness of the traffic increases from uniform to a burstiness of 2, to a burstiness of 4 and finally to a burstiness of 20, the performance of the non-degenerate buffer becomes increasingly better than the performance of the degenerate buffer with same buffer depth. In fact the performance of the non-degenerate buffer approaches asymptotically the performance of the degenerate buffer with the same holding time but a much higher buffer depth (e.g., the non-degenerate buffer which has buffer depth 4 has almost the same performance as the degenerate buffer with buffer depth 6.

Figure 7:
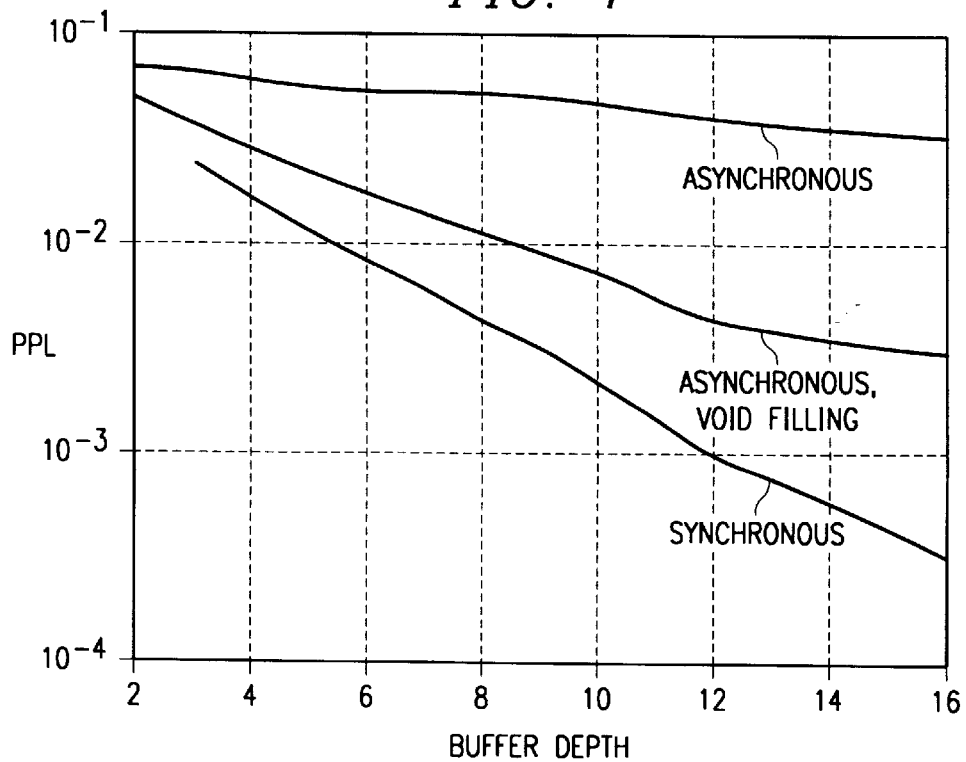
FIG. 7 is a graph of simulated packet loss versus buffer depth for optical buffers operating under synchronous, asynchronous, and asynchronous with void filling conditions to illustrate the benefits of the void filling operation of the present invention.

FIG. 7 highlights the advantages of the void filling and scheduling software 100 of the present invention. In FIG. 7, simulations are presented for a 4×4 optical switch performing under asynchronous, variable length bursty traffic with burstiness 4 and traffic load 0.8 incorporating void filling and scheduling software 100 of the present invention (as compared to synchronous and asynchronous traffic conditions without void filling according to the present invention). The top line labeled asynchronous is the packet loss results over buffer depth for an asynchronous operation without void filling, while the bottom line labeled synchronous is the packet loss result for synchronous operation without void filling. The middle line, labeled "asynchronous, void filling" shows the asynchronous operation utilizing the void filling and scheduling software of the present invention. When comparing the two asynchronous graphs, it is evident that void filling improves markedly the performance, and in fact drives performance towards the synchronous performance. Furthermore, the increase in performance is more substantial the greater the buffer depth. For example, at a buffer depth of 4, the asynchronous packet loss is approximately 0.75 whereas the packet loss for the asynchronous, void filling operation is approximately 0.5, for an improvement of approximately 0.25 (or 50%) less packet loss for the void filling operation. In comparison, at a buffer depth of 16, the asynchronous packet loss is approximately 0.5 whereas the packet loss for the asynchronous, void filling operation is approximately 0.005, for an improvement of approximately 0.495 (or 99%) less packet loss for the void filling operation.

Although the present invention has been described in detail, it should be understood that various changes, substitutions and alterations can be made hereto without departing from the spirit and scope of the invention as described by the appended claims.

What is claimed is:

1. A system for filling voids between optical signals at an output fiber of an optical switch comprising:
   an optical buffer, comprising:
      an output fiber comprising a plurality of wavelengths; and
      a plurality of delay lines for inducing unique delays in an optical signal;
   a memory that includes a wavelength, a position in time, and a duration for each void between outgoing optical signals in each output fiber; and
   a void filling and scheduling software program, executable by a processor to, upon the arrival of a new optical signal having an arrival time and a duration:
      calculate an available delay for each delay line as measured from the arrival time of the new optical signal; and
      schedule the new optical signal within a particular void if:
         a particular available delay falls within the position in time of the particular void; and
         the duration of the new optical signal measured from the particular available delay fits within the duration of the particular void.

2. The system of claim 1, wherein the void filling and scheduling software program is further executable to build a plurality of virtual wavelengths equal to the number of the plurality of wavelengths in the output fiber.

3. The system of claim 2, wherein the void filling and scheduling software program further comprises:
   a void filling program executable to attempt to schedule the new optical signal within a void; and
   a conventional scheduling program executable to schedule the new optical signal if the void filling program is unsuccessful in scheduling the new optical signal within a void.

4. The system of claim 3, wherein the conventional scheduling program is executable to:
   determine the virtual wavelength with the minimum occupancy; and
   schedule the new optical signal on the minimum occupancy virtual wavelength at a minimum delay that is not occupied by a void.

5. The system of claim 4, wherein the conventional scheduling program is further executable to store in memory a new void created by the scheduling of the new optical signal, the new void having a start time equal to an end time of the minimum occupancy, an end time equal to the arrival time plus the minimum non-occupied delay plus the new optical signal length, and a wavelength equal to the minimum occupancy wavelength.

6. The system of claim 5, wherein performing the re-writing step is accomplished by the void filling and scheduling software program by:
   maintaining a predetermined number of void memory positions in the memory;
   placing a new void in each of the predetermined number of void memory positions; and
   once all of the predetermined number of void memory positions are filled, re-writing the oldest void memory position with a set of data for a new void upon its creation.

7. The system of claim 1, wherein the void filling and scheduling software program is further executable to:
   inspect each void in the memory;
   examine each delay line in order from the minimum delay to the maximum delay; and
   schedule the new optical signal by delaying the new optical signal using the minimum delay that falls within the position in time of the particular void.

8. The system of claim 1, wherein the void filling and scheduling software program is further executable to:
   inspect each void in the memory in order from nearest to furthest away from the current time; and
   attempt to schedule the new optical signal into a void whose position in time is nearest the current time.

9. The system of claim 1, wherein the void filling and scheduling software program is further executable to calculate a time of arrival for each new optical signal.

10. The system of claim 1, wherein the void filling and scheduling software program is further executable to:
    assign the new optical signal a time to leave equal to the arrival time of the new optical signal plus the particular delay; and
    assign the new optical signal a wavelength to leave equal to the wavelength of the particular void.

11. The system of claim 10, wherein the void filling and scheduling software program is further executable to store a new void within the memory, the new void having a wavelength equal to the wavelength of the particular void, a start time equal to the arrival time of the new optical signal plus the particular delay, and an end time equal to the end time of the particular void.

12. The system of claim 1, wherein the void filling and scheduling software program is further executable to, if the new optical signal cannot be scheduled in any existing void, schedule the new optical signal using a conventional scheduling routine.

13. A system comprising a void filling and scheduling software program stored on a computer-readable medium and executable by a processor, upon the arrival of a new optical data packet having an arrival time and a duration at an optical switch having a plurality of delay lines, to:
    assign a current time to the new optical data packet;
    determine a destination output fiber for the new optical data packet; and
    schedule the new optical data packet in a void on the output fiber that has both a delay position that falls within the void and an end position that will accommodate the new optical data packet positioned beginning at the delay position, wherein the delay position is measured from the current time.

14. The system of claim 13, wherein the void filling and scheduling software program is further executable to build a plurality of virtual wavelengths equal to a number of wavelengths in the output fiber.

15. The system of claim 14, wherein the void filling and scheduling software program further comprises:
    a void filling program executable to attempt to schedule the new optical data packet within a void; and
    a conventional scheduling program executable to schedule the new optical signal if the void filling program is unsuccessful in scheduling the new optical signal within a void.

16. The system of claim 15, wherein the conventional scheduling program is executable to:
    determine the virtual wavelength with the minimum occupancy; and schedule the new optical data packet on the minimum occupancy virtual wavelength at a minimum delay that is not occupied by an existing void.

17. The system of claim 16, wherein the conventional scheduling program is further executable to store in memory a new void created with the scheduling of the new optical data packet.

18. The system of claim 17, wherein the new void has a start time equal to the current occupancy, an end time equal to the arrival time plus the minimum non-occupied delay plus the length of the new optical data packet, and a wavelength equal to the minimum occupancy wavelength.

19. The system of claim 18, wherein the void filling and scheduling software program is operable to store the new void in memory by:
   maintaining a predetermined number of void memory positions in the memory;
   placing a new void in each of the predetermined number of void memory positions; and
   once all of the predetermined number of void memory positions are filled, re-writing the oldest void memory position with a set of data for a new void upon its creation.

20. The system of claim 13, wherein the void filling and scheduling software program is further executable to:
   inspect each void in a memory;
   examine each delay line in order from a minimum delay to a maximum delay; and
   schedule the new optical data packet using a minimum delay that falls within a particular void.

21. The system of claim 20, wherein the void filling and scheduling software program is further executable to store a new void within the memory, the new void having a wavelength equal to the wavelength of the particular void, start time equal to the time of arrival of the new optical data packet plus the particular delay, and an end time equal to the end time of the particular void.

22. The system of claim 13, wherein the void filling and scheduling software program is further executable to:
   inspect each void in a memory in ascending position in time from the current time; and
   schedule the new optical data packet into a void whose position in time is nearest the current time.

23. The system of claim 13, wherein the void filling and scheduling software program is further executable to calculate a time of arrival for a new optical data packet and schedule the new optical data packet by delaying the new optical data packet using a delay line that falls within the void.

24. The system of claim 13, wherein the void filling and scheduling software program is further executable to, if the new optical data packet cannot be scheduled in a void, schedule the new optical data packet using a conventional scheduling routine.

25. A method for scheduling optical data packets in order to fill voids created between existing outgoing optical data packets on output fibers from an optical switch having an optical buffer with a number of delay lines, comprising:
   creating a virtual wavelength field for each wavelength in each of the output fibers;
   assigning a current time to a new optical data packet;
   determining a destination output fiber for the new optical data packet; and
   performing a void filling operation, comprising:
      (a) determining a delay position for a delay line within the optical buffer as measured from the current time;
      (b) comparing a position of each of the existing voids in the destination fiber across each of the destination fiber's virtual wavelength fields to the determined delay position;
      (c) scheduling the new optical packet in a chosen void if the delay position falls within an existing void position and if the delay position plus the new optical data packet length fall within an end position of the void; and
      (d) repeating steps (a)–(d) for each delay line within the optical buffer.

26. The method of claim 25, wherein the performing the void filling operation further comprises building a plurality of virtual wavelengths equal to the number of the plurality of wavelengths in the output fiber.

27. The method of claim 25, wherein the performing the void filling operation further comprises:
   inspecting each void in the memory in order from a void nearest the current time to a void furthest from the current time;
   examining each delay line in order from a minimum delay to a maximum delay; and
   scheduling the new optical data packet using either the minimum delay that falls within the position in time of a void or within a void whose position in time is nearest the current time.

28. The method of claim 25, wherein the performing the void filling operation further comprises, if the new data packet is scheduled within a particular void:
   assigning the new optical data packet a time to leave equal to the time of arrival of the new optical data packet plus the particular delay; and
   assigning the new optical data packet a wavelength to leave equal to the wavelength of the particular void.

29. The method of claim 25, wherein the performing the void filling operation further comprises storing a new void within the memory, the new void having a wavelength equal to the wavelength of the particular void, start time equal to the time of arrival of the new optical data packet plus the particular delay, and an end time equal to the end time of the particular void.

30. The method of claim 25, further comprising, if the new optical data packet cannot be scheduled in any existing void, scheduling the new optical data packet using a conventional scheduling routine.

31. The method of claim 30, wherein the step of scheduling using a conventional scheduling routine further comprises:
   determining the virtual wavelength with the minimum occupancy; and
   scheduling the new optical data packet on the minimum occupancy virtual wavelength at a minimum delay that is not occupied by an existing void.

32. A method for scheduling optical data packets in order to fill voids created between existing outgoing optical data packets on output fibers from an optical switch having an optical buffer with a number of delay lines, comprising:
   creating a virtual wavelength field for each wavelength in each of the output fibers;
   assigning a current time to a new optical data packet;
   determining a destination output fiber for the new optical data packet; and
   scheduling the new optical data packet in a void that has both a delay position that falls within the void and an end position that will accommodate the new optical data packet positioned beginning at the delay position, wherein the delay position is a position associated with a particular delay line as measured from the current time.

33. The method of claim 32, wherein the scheduling further comprises building a plurality of virtual wavelengths equal to the number of the plurality of wavelengths in the output fiber.

34. The method of claim 32, wherein the scheduling further comprises:

calculating a time of arrival for a new optical data packet;

inspecting each void in the memory;

examining each delay line in order from the minimum delay to the maximum delay; and attempting to schedule the new optical data packet using the minimum delay that falls within the position in time of a void.

35. The method of claim 32, wherein the scheduling further comprises, if the new data packet is scheduled within a particular void:

assigning the new optical data packet a time to leave equal to the time of arrival of the new optical data packet plus the particular delay; and assigning the new optical data packet a wavelength to leave equal to the wavelength of the particular void.

36. The method of claim 32, wherein the scheduling further comprises storing a new void within the memory, the new void having a wavelength equal to the wavelength of the particular void, start time equal to the time of arrival of the new optical data packet plus the particular delay, and an end time equal to the end time of the particular void.

37. The method of claim 36, further comprising, if the new optical data packet cannot be scheduled in any existing void, scheduling the new optical data packet using a conventional scheduling routine.

38. The method of claim 37, wherein the scheduling further comprises:

determining the virtual wavelength with the minimum occupancy; and scheduling the new optical data packet on the minimum occupancy virtual wavelength at a minimum delay that is not occupied by an existing void.

39. The method of claim 38, wherein scheduling further comprises storing in memory a new void created with the scheduling of the new optical data packet, the new void having a start time equal to the current occupancy, an end time equal to the arrival time plus the minimum non-occupied delay plus the length of the new optical data packet, and a wavelength equal to the minimum occupancy wavelength.

40. The method of claim 39, further comprising performing a void re-writing step in order to store the new void within the memory.

41. The method of claim 40, wherein performing the re-writing step further comprises:

maintaining a predetermined number of void memory positions in the memory;

placing a new void each of the predetermined number of void memory positions; and once all of the predetermined number of void memory positions are filled, re-writing the oldest void memory position with a set of data for a new void upon its creation.

42. A method for scheduling optical data packets in order to fill voids created between existing outgoing optical data packets on output fibers from an optical switch having an optical buffer with a number of delay lines, the method performed by a void filling computer program stored on a computer-readable medium, the void filling computer program executable to:

create a virtual wavelength field for each wavelength in each of the output fibers;

assign a current time to a new optical data packet;

determine a destination output fiber for the new optical data packet; and schedule the new optical data packet to be output in a void that has both a delay position that falls within the void and an end position that will accommodate the new optical data packet positioned beginning at the delay position, wherein the delay position is a position in time determined using a particular delay line as measured from the current time.

43. The method of claim 42, wherein the void filling computer program is further executable to:

inspect each void in each of the virtual wavelength fields associated with a specific destination fiber;

calculate a time of arrival for a new optical data packet;

inspect each void in the memory;

examine each delay line in order from the minimum delay to the maximum delay; and attempt to schedule the new optical data packet using the minimum delay that falls within the position in time of a void.

44. The method of claim 42, wherein the void filling computer program is further executable to:

assign the new optical data packet a time to leave equal to the time of arrival of the new optical data packet plus the particular delay; and assign the new optical data packet a wavelength to leave equal to the wavelength of the particular void.

45. The method of claim 42, further comprising, if the new optical data packet cannot be scheduled in any existing void, scheduling the new optical data packet using a conventional scheduling routine within the void filling and scheduling program.

46. The method of claim 45, wherein the void filling and scheduling program is further executable to store in memory a new void created with the scheduling of the new optical data packet.

47. The method of claim 46, wherein the void filling and scheduling program is further operable to perform a void re-writing step in order to store the new void within the memory.

* * * * *